July 8, 1952  A. W. BARKER  2,602,421
ANIMAL WEANER
Filed Feb. 4, 1949  2 SHEETS—SHEET 1
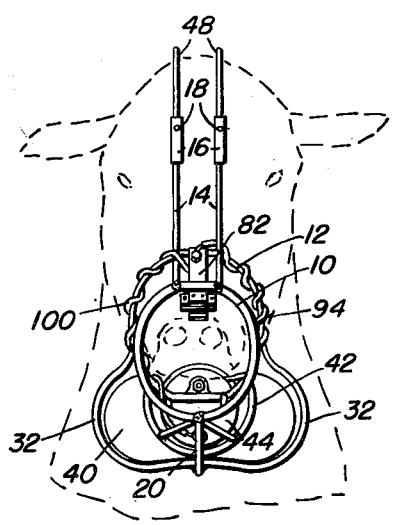
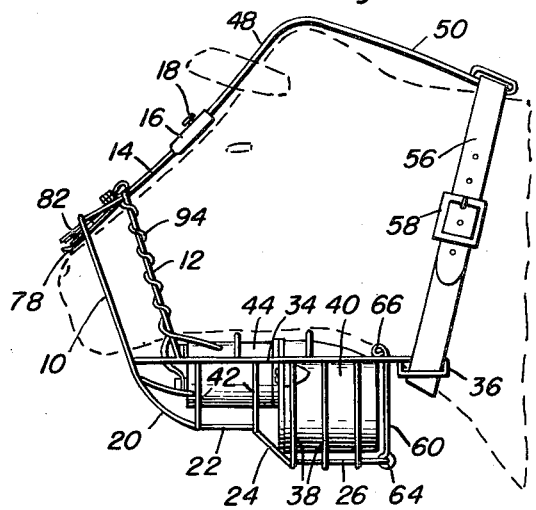
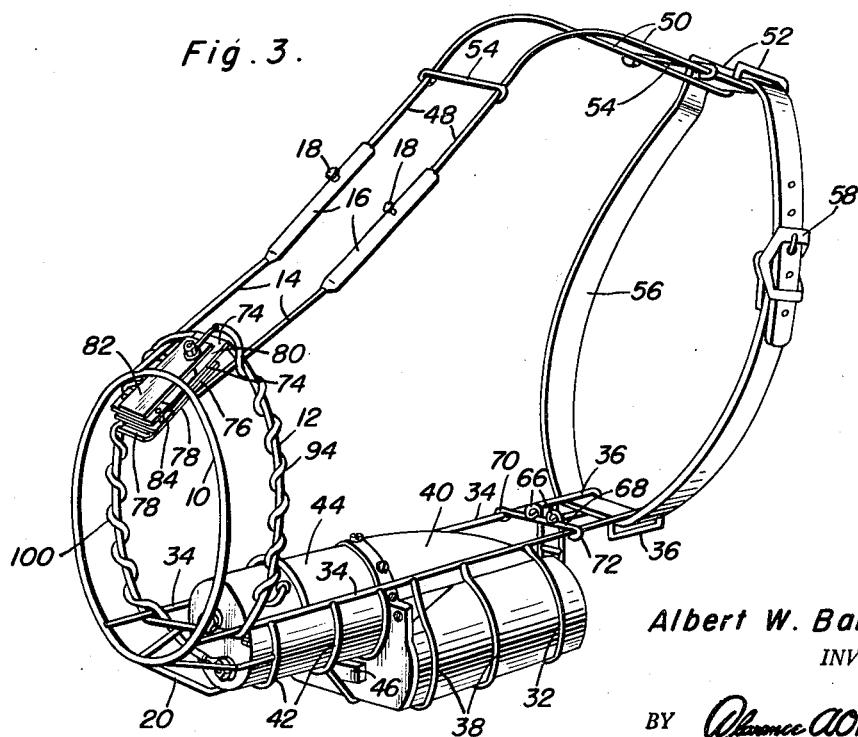
Albert W. Barker
INVENTOR.

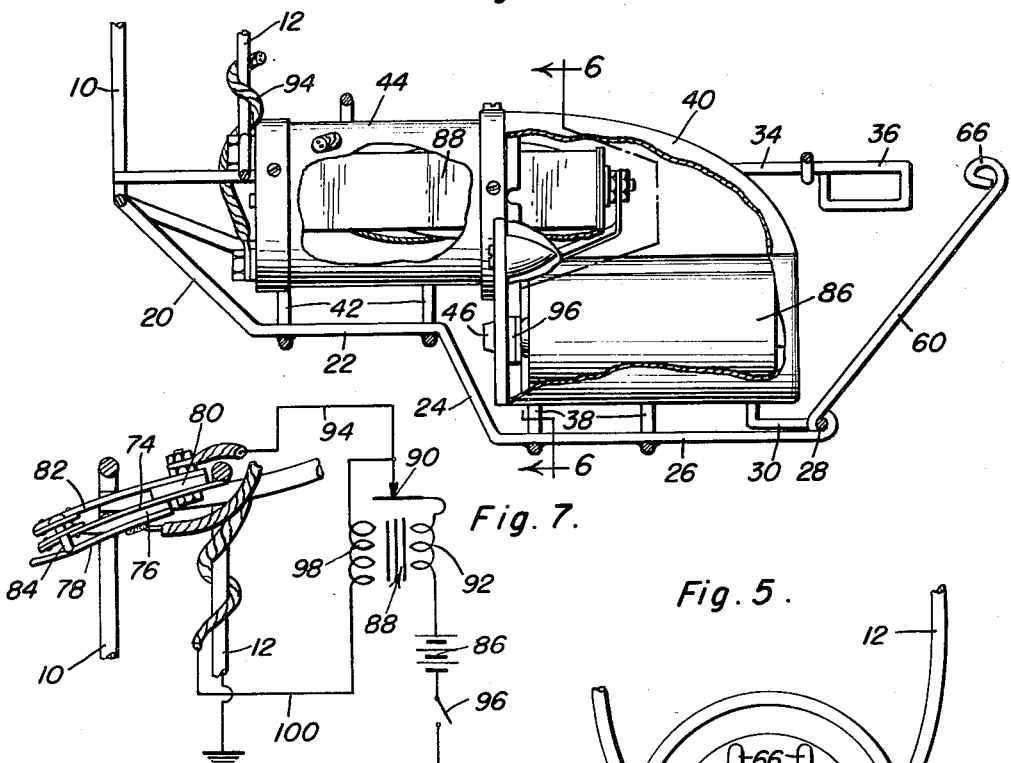

Patented July 8, 1952

2,602,421

UNITED STATES PATENT OFFICE 2,602,421

ANIMAL WEANER

Albert W. Barker, Billings, Mont.

Application February 4, 1949, Serial No. 74,611

4 Claims. (Cl. 119—130)

This invention relates to an animal weaner and has for its primary object to break calves and like animals from the habit of nursing.

Another object is to wean calves and colts, break cows from sucking themselves, and prevent stock from breeding.

The unit of this device may be used on various sizes and shapes of headstalls, this making it possible to use the device on both horses and cattle, as their heads are entirely different in shape, and also so it may be used on young animals as well as the grown ones.

A further object is to impart an electrical shock to the animal when it attempts to nurse.

The above and other objects may be attained by employing this invention which embodies among its features a muzzle of conducting material adapted to be supported on the nose of an animal, a source of vibratory electrical energy carried by the muzzle, one terminal of said source being electrically coupled to the muzzle, a movable contact carried by but electrically isolated from the muzzle, said movable contact being electrically coupled to the opposite terminal of said source of electrical energy and said movable contact when pressed against an extraneous object being adapted to engage the nose of the animal and impart an electrical shock thereto.

Other features include a normally de-energized source of high voltage low amperage vibratory electrical energy, one terminal of which is electrically coupled to the muzzle and the opposite terminal of which is coupled to the movable contact and means supported on the muzzle in the path of movement of the movable contact and being adapted when the movable contact is pressed against an extraneous object to energize the source of vibratory electrical energy.

In the drawings:

Figure 1 is a front view in elevation of a muzzle embodying the features of this invention shown as supported on the nose of an animal, Figure 2 is a side view of the muzzle and nose of an animal illustrated in Figure 1, Figure 3 is a perspective view of the muzzle on an enlarged scale, Figure 4 is a longitudinal sectional view through the lower portion of the muzzle illustrating the source of vibratory electrical energy mounted therein, with portions of the case broken away more clearly to illustrate certain details of construction, Figure 5 is a rear view of the device illustrated in Figure 4, Figure 6 is a fragmentary sectional view taken substantially on the line 6—6 of Figure 4, and Figure 7 is a wiring diagram illustrating the manner in which the muzzle and movable contact are energized.

Referring to the drawings in detail, the muzzle above referred to comprises a pair of spaced parallel rings 10 and 12 which are adapted to encircle the nose of an animal. The ring 12 is of slightly larger diameter than the ring 10, and fixed in closely spaced parallel relation to the rings 10 and 12 are spaced parallel rods 14 carrying at their ends remote from the rings 10 and 12 spaced parallel socket members 16 into which are threaded set-screws 18.

Extending downwardly and rearwardly from the ring 10 at a point diametrically opposite a point midway between the arms 14 is a supporting bar 20, the lower rear end of which is bent angularly to form an extension 22 which lies substantially parallel to the axis of the ring 10 and in the same vertical plane with said axis. This extension 22 terminates at its rear end in a downwardly and rearwardly extending arm 24 which in turn, terminates in an arm 26 which lies along an axis extending parallel to and in the same vertical plane with the axis of the extension 22. The rear end of the arm 26 has welded or otherwise fixed thereto a cross-bar 28 which lies along an axis extending perpendicular to the axis of the arm 26 and is provided at opposite ends with spaced parallel forward extensions 30 which terminate at their extreme forward ends in a pair of upwardly and outwardly curved arms 32. Extending rearwardly from the ring 10 and through the ring 12 in spaced parallel relation and on opposite sides of the junction of the extension 20 with the ring 10 are side bars 34 which extend rearwardly beyond the rear end of the arm 26 and terminate in strap receiving loops 36. The upper ends of the curved extensions 32 of the bar 28 are welded or otherwise secured to the side bars 34 near the loops 36, and welded or otherwise attached to the arm 26 in spaced parallel relation to the curved extensions 32 are spaced parallel yoke members 38 which conform to the contour of the curved extensions 32 and are welded or otherwise attached to the side bars 34 as will be readily understood upon reference to Figure 3. The extensions 32, the bottom arm 26 and the yokes 38, together with the side bars 34 cooperate to form a cradle in which is supported a case 40 housing the electrical energy supply to be more fully hereinafter described. A similar cradle is formed by curved arms 42 which join the extension 22 with the side bars 34 to support the case 44 in which the induction coil and vibrator of the device is housed. The case 44 and the case 40 are joined together to form a complete unit and the front wall of the case 48 is equipped with a sliding button 46 controlling the on and off switch for the device.

Supported in the sockets 16 for longitudinal adjustment therein is a pair of spaced parallel animal head engaging bars 48, the upper ends of which terminate in rearwardly and downwardly inclined extensions 50 having formed at their extreme rear ends strap receiving loops 52. The bars 48 and extensions 50 are held in spaced parallel relation by tie bars 54, and hence the bars 48, extensions 50 with the tie bars 54 form a head engaging member which is adjustably coupled to the bars 14 through the medium of the sockets 16 and set screws 18. A throat encircling strap 56 is threaded through the loops 36 and 52 to encircle the neck of the animal and hold the device in place. This strap is equipped with a conventional buckle 58 by means of which it may be adjusted over the head of the animal.

Pivotally supported on the cross-bar 28 previously described is a gate member comprising spaced parallel bars 60 joined by cross bars 62 and coupled to the cross-bar 26 by means of loops 64 for swinging movement about the axis of the cross-bar 28. The ends of the bars 60 remote from the loops 64 terminate in latching loops 66 which are adapted to engage a transversely extending latch bar 68 one end of which terminates in a loop 70 for pivotal connection to one of the side bars 34, while the opposite end of the loop 68 terminates in a hook 72 which is adapted to detachably engage the opposite side bar 34.

Welded or otherwise attached to the ring 12 between the bars 14 is a plate 74 of any suitable conducting material. This plate extends forwardly within the ring 10 and terminates at a point in advance of the ring as will be readily understood upon reference to Figure 7. Secured to the underside of the plate 74 is an insulating block 76 which supports on its underside a nose contacting plate 78 which projects forwardly and slightly beyond the forward end of the plate 74. The plate 78 is electrically isolated from the plate 74 by the insulating block 76, and secured to the upper side of the plate 74 near its junction with the ring 12 is an insulating block 80 carrying a movable contact plate 82 which extends forwardly beyond the ring 10 in spaced relation to the plate 74. The plate 82 is provided adjacent its forward end with spaced parallel depending contact fingers 84 which project downwardly beyond the opposite side edges of the plates 74 and 78 and are adapted to contact the nose of the animal when pressure is applied to the plate 82 to move it toward the plate 74. It will be understood, of course, that the plate 82 is electrically isolated from the plate 74 by the insulating block 80.

Contained within the case 40 is a suitable primary source of electrical power 86 such as a pair of miniature dry cells coupled in series. An induction coil designated generally 88 (Fig. 7) is housed within the case 44 and is equipped with a conventional vibrator 90, one terminal of which is coupled to the primary winding 92 of the induction coil in a conventional manner. The opposite terminal of the primary winding 92 is electrically coupled to one terminal of the primary power source 86 and the opposite terminal of the vibrator 90 is coupled through the medium of an insulating conductor 94 to the plate 82. The opposite terminal of the primary source of electrical energy 86 is grounded through a conventional switch 96 operable by the button 46 to the rings 10 and 12 and consequently, with the switch closed when the plate 82 moves into engagement with the plate 74 an electrical circuit will be completed through the primary winding 92 of the induction coil 88. One terminal of the secondary winding 98 of the induction coil 88 is coupled to the conductor 94, and the opposite terminal of the secondary winding 98 is coupled through the medium of an insulating conductor 100 to the snout contacting plate 78. It will thus be seen that when the plate 82 is advanced into contact with the plate 74 to close the circuit through the primary winding 92 of the induction coil, the prongs 84 will move into contact with the nose of the animal to cause a flow of vibratory electrical energy through the secondary winding 98, the conductor 94, the plate 82 and prongs 84 through the nose of the animal back through the plate 78 and conductor 100 to the secondary winding of the induction coil. In this way, the plate 82 when pressed by the animal against an extraneous object not only completes the electrical circuit through the primary winding 92 of the induction coil 88, but also completes the vibratory secondary current through the nose of the animal producing an unpleasant shock therein.

In use, it will be understood that the muzzle is fastened about the head of the animal as suggested in Figures 1 and 2 and when the animal endeavors to nurse, the plate 82 coming in contact with the body of the mother anmial moves to complete the circuit through the primary winding 92 of the induction coil 88 and at the same time the prongs 84 are moved into contact with the nose of the animal so that vibratory electrical energy will pass through the nose of the animal between the prongs 84 and the plate 78.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. An animal weaner attachable to the head of the animal comprising a nose piece consisting of a pair of rigid, rigidly spaced rings, a top adapted to overlie the face and the top of the head of an animal consisting of a pair of substantially parallel, elongated rigid members secured adjacent the forward extremities thereof to the rings and having rear extremities terminating in collar receiving loops, said members each including telescoping means intermediate its extremities for adjusting the length thereof, a base for underlying an animal head consisting of another pair of substantially parallel, elongated, rigid members which adjacent the forward extremities thereof engage the rings at a position diametrical to the first mentioned members and having rear extremities terminating in collar receiving loops, a source of electrical energy, means securing said source to said second named rigid members, and a contact switch secured to one of said rings and electrically connected to said source of energy and responsive to engaging an extraneous object to deliver a shock to the animal.

2. An animal weaner comprising a nose piece consisting of a pair of rigid, rigidly spaced rings, a top adapted to overlie the face and the top of the head of an animal consisting of a pair of substantially parallel, elongated rigid members secured adjacent the forward extremities thereof to the rings and having rear extremities terminating in collar receiving loops, a base for underlying an animal head consisting of a second pair of substantially parallel, elongated, rigid members which adjacent the forward extremities thereof engage the rings at a position diametrical to the first mentioned members and having rear extremities terminating in collar receiving loops, a collar for embracing the neck of an animal threaded through all of said loops, a cradle depending from said second pair of members, a source of electrical energy carried in said cradle, and a contact switch secured to one of said rings between said first mentioned pair of members and electrically connected to said source of energy and responsive to engaging an extraneous object to deliver an electrical shock to an animal equipped with the muzzle.

3. The combination of claim 2, wherein said first mentioned pair of members each include telescoping elements and means for retaining the elements in adjusted relationship.

4. An animal weaner for attachment to the head of the animal including a nose piece comprising a pair of rigid, rigidly connected rings, a base structure for underlying the animal's head comprising a pair of substantially parallel, elongated, rigid members having front extremities secured to the rings, a cradle depending from said pair of members, a source of electrical energy carried in said cradle, a contact switch secured to one of said rings and electrically connected to said source of energy and responsive to engaging an extraneous object to deliver a shock to an animal to which the weaner is attached, and means for attaching said rings and members to the head of the animal.

ALBERT W. BARKER.

REFERENCES CITED

The following references are of record in the file of this patent:

UNITED STATES PATENTS

| Number | Name | Date |
|---|---|---|
| 67,016 | Belmer et al. | July 23, 1867 |
| 868,145 | Swender | Oct. 15, 1907 |
| 1,082,372 | Thompson | Dec. 23, 1913 |
| 1,751,313 | Faulhaber | Mar. 18, 1935 |
| 2,177,789 | Sacker | Oct. 31, 1939 |
| 2,212,160 | Kelly | Aug. 20, 1940 |
| 2,263,503 | Kennedy | Nov. 18, 1941 |
| 2,442,992 | Beard | June 8, 1948 |
| 2,510,337 | Franklin | June 6, 1950 |